United States Patent [19]

Büttner et al.

[11] Patent Number: 5,539,792
[45] Date of Patent: Jul. 23, 1996

[54] GRID-SHAPED SPACER FOR A NUCLEAR-REACTOR FUEL ASSEMBLY

[75] Inventors: Martin-Benno Büttner, Heroldsbach; Otto Porzelt, Herzogenaurach; Bernd Block, Erlangen; Dirk Blavius, Adelsdorf, all of Germany

[73] Assignee: Siemens Aktiengesellschaft, Munich, Germany

[21] Appl. No.: 421,191

[22] Filed: Apr. 13, 1995

Related U.S. Application Data

[63] Continuation-in-part of PCT/EP93/02683 Sep. 30, 1993

[30] Foreign Application Priority Data

Oct. 13, 1992 [EP] European Pat. Off. ............ 92117489

[51] Int. Cl.$^6$ .................................................... G21C 3/34
[52] U.S. Cl. ...................... 376/441; 376/442; 376/446; 376/448; 376/462; 376/438
[58] Field of Search .................................. 376/441, 442, 376/446, 448, 462, 438; 976/DIG. 71, DIG. 72, DIG. 79, DIG. 80

[56] References Cited

U.S. PATENT DOCUMENTS

| | | | |
|---|---|---|---|
| 3,904,475 | 9/1975 | Tashima | 376/441 |
| 4,077,843 | 3/1978 | Patterson et al. | 376/442 |
| 4,239,597 | 12/1980 | Christiansen | 376/441 |
| 4,578,239 | 3/1986 | Steinke | 376/441 |
| 4,666,663 | 5/1987 | Steinke | 376/441 |
| 4,714,585 | 12/1987 | Kast | 376/442 |

FOREIGN PATENT DOCUMENTS

| | | |
|---|---|---|
| 0027203 | 4/1981 | European Pat. Off. . |
| 0436116 | 7/1991 | European Pat. Off. . |
| 0452706 | 10/1991 | European Pat. Off. . |
| 2366669 | 4/1978 | France . |
| 2644297 | 4/1978 | Germany . |

*Primary Examiner*—Charles T. Jordon
*Assistant Examiner*—Meena Chelliah
*Attorney, Agent, or Firm*—Herbert L. Lerner; Laurence A. Greenberg

[57] ABSTRACT

A grid-shaped spacer includes a sheet-metal web having a web aperture formed therein defining two spaced mutually opposite aperture edges. The aperture edges oppose an elongation of an elongate spring which is curved about a direction transverse to its own longitudinal direction and which has a tab that engages through the web aperture at each of two spring ends. At least one of the tabs is snapped into a notch formed in one of the spring edges opposing the elongation of the spring.

6 Claims, 4 Drawing Sheets

GRID-SHAPED SPACER FOR A NUCLEAR-REACTOR FUEL ASSEMBLY

CROSS-REFERENCE TO RELATED APPLICATION

This application is a Continuation of International Application Serial No. PCT/EP93/02683, filed Sep. 30, 1993.

BACKGROUND OF THE INVENTION

1. Field of the Invention

The invention relates to a grid-shaped spacer including sheet-metal webs forming meshes for fuel rods of a nuclear-reactor fuel assembly, an elongate spring being disposed in a mesh, being curved about a direction transverse to its own longitudinal direction and having a tab at each of two spring ends engaging through a web aperture being formed in one of the sheet-metal webs and defining two spaced, mutually opposite aperture edges opposing an elongation of the spring.

Such a spacer is known from German Published, Non-Prosecuted Application DE-OS 26 44 297, corresponding to Published U.K. Application 1 539 367. Two elongate leaf springs of that spacer have a tab at one spring end on one longitudinal edge of the leaf spring and a tab at the other spring end on the other longitudinal edge of that leaf spring. The web aperture is divided in two by means of a transverse sheet. When a first leaf spring is located on the one side of the sheet-metal web, each of its two tabs engages through another part of the web aperture in the sheet-metal web and bears flat against the other side of the sheet-metal web. Located on that other side is the second leaf spring which likewise engages with each of its two tabs through another part of the web aperture in the sheet-metal web in each case. On the side of the sheet-metal web having the first leaf spring, those tabs of the second leaf spring are each located on the other longitudinal edge of the first leaf spring, on which that first leaf spring has no tab at the respective spring end, and they bear flat against the sheet-metal web there. The two leaf springs are thereby anchored firmly relative to one another on the sheet-metal web.

SUMMARY OF THE INVENTION

It is accordingly an object of the invention to provide a grid-shaped spacer for a nuclear reactor fuel assembly, which overcomes the hereinafore-mentioned disadvantages of the heretofore-known devices of this general type and in which an elongate spring is anchored firmly on sheet-metal webs of the grid-shaped spacer on one side of such a sheet-metal web, without a second spring on the other side of the respective sheet-metal web being necessary for this purpose.

With the foregoing and other objects in view there is provided, in accordance with the invention, a grid-shaped spacer, comprising sheet-metal webs forming meshes for fuel rods of a nuclear-reactor fuel assembly, one of the webs having a web aperture formed therein defining two spaced-apart, mutually opposite aperture edges; an elongate spring being disposed in a mesh, having a given longitudinal direction and being curved about a direction transverse to the given longitudinal direction, the spring including two spring ends each having a tab engaging through the web aperture with the mutually opposite aperture edges opposing an elongation of the spring; and at least one of the tabs at one of the two spring ends being snapped into a notch formed in one of the aperture edges opposing the elongation of the spring.

The tab at one spring end is snapped-in especially firmly in the notch in the aperture edge opposing the elongation of the elongate spring, if the spring is pretensioned mechanically. This pretension is increased further if a fuel rod is located in the mesh of the grid-shaped spacer having the spring. The spring bears flat against the fuel rod with pretension and presses it against knobs on other sheet-metal webs of the grid-shaped spacer. The notch can be made only so deep that the elongate spring is pretensioned mechanically, in the snap-in position.

In accordance with another feature of the invention, one aperture edge opposing the elongation of the spring forms an inclined plane ascending towards the notch. As a result, the mechanical pretension of the spring is obtained automatically when the tab at the spring end is brought into the snap-in position. The height of ascent of the inclined plane and, if appropriate, the depth of the notch, determine the mechanical pretension of the elongate spring in the snap-in position.

In accordance with a further feature of the invention, the spring is a leaf spring having two longitudinal edges, the tabs at each of the spring ends are both attached to one of the longitudinal edges of the leaf spring, the tabs have mutually confronting edges each having a guide notch formed therein, and there is provided a guide sheet engaging in each of the guide notches and being disposed laterally relative to the spring at the web aperture. In this way, a captiveness of the spring is achieved even if it were to break apart.

In accordance with an added feature of the invention, the tabs are first tabs, and there are provided second or additional tabs each being associated with a respective one of the first tabs on the other of the longitudinal edges at a respective one of the spring ends of the spring, the second tabs engaging transversely through the web aperture and each having a guide notch formed therein into which the guide sheet engages, and the associated first and second tabs each have a further notch formed therein into which a respective one of the aperture edges opposing the elongation of the spring engages. This development improves the captiveness.

In accordance with an additional feature of the invention, both the associated first and second tabs bear against one of the aperture edges opposing the elongation of the spring at each of the spring ends. This development safeguards the leaf spring against skewing.

In accordance with a concomitant feature of the invention, the aperture edge opposing the elongation of the spring engages through the tab.

Other features which are considered as characteristic for the invention are set forth in the appended claims.

Although the invention is illustrated and described herein as embodied in a grid-shaped spacer for a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
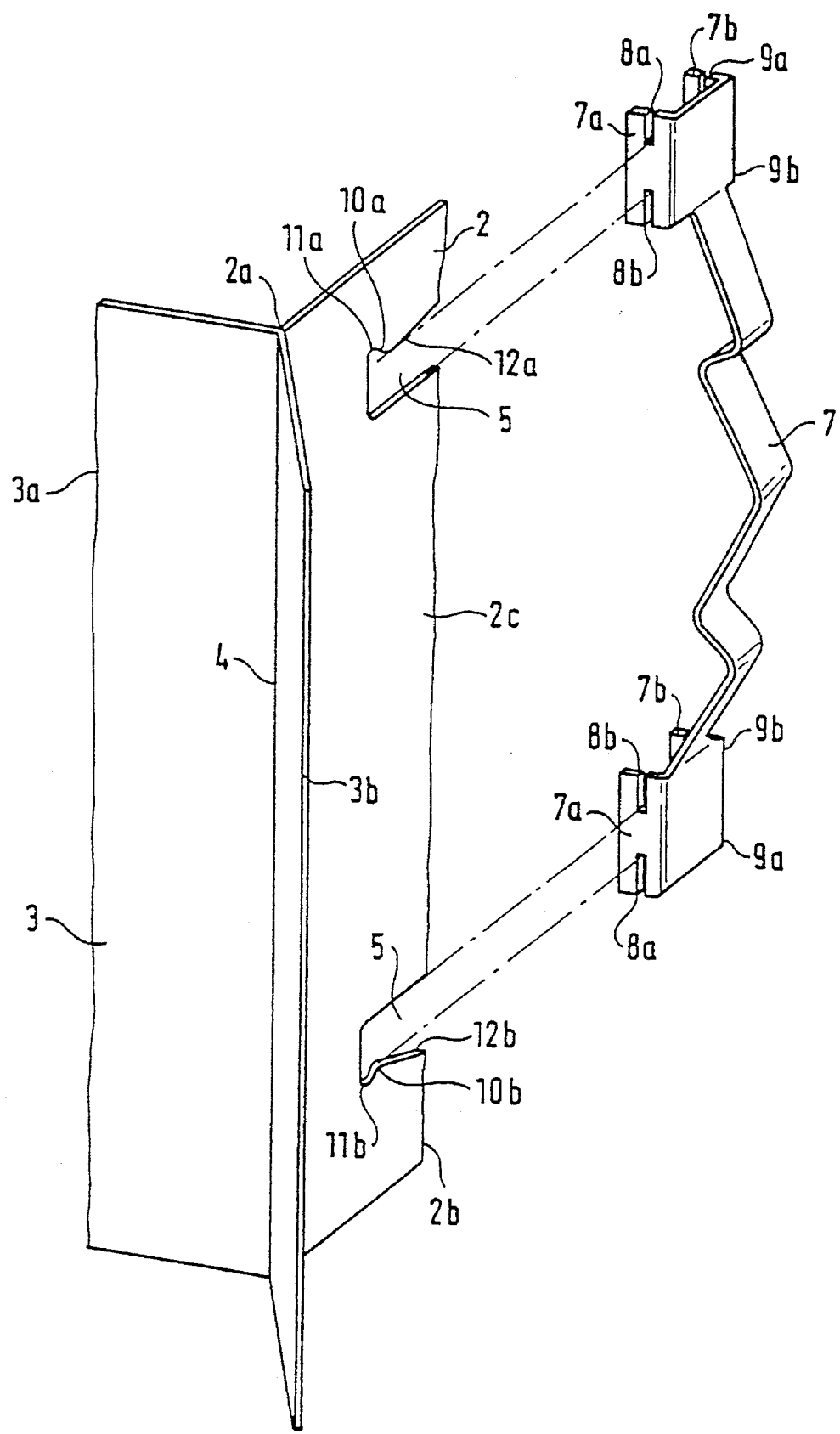
FIG. 1 is a fragmentary, diagrammatic, perspective view of a web of a grid-shaped spacer with an associated leaf spring.

Referring now to the figures of the drawing in detail and first, particularly, to FIG. 1 thereof, there is seen a first sheet-metal web 2 and a second sheet-metal web 3. The second sheet-metal web 3 forms a bending edge 4 which has an identical spacing from two side edges 3a and 3b of this second sheet-metal web 3 that are parallel to the bending edge 4. On one of its sides, the second sheet-metal web 3 forms an angle of 120° relative to the bending edge 4 and, on the other of its sides, the second sheet-metal web 3 forms an angle of 240° relative to the bending edge 4. On that other side, the first sheet-metal web 2 is firmly welded to a first side edge 2a at the bending edge 4. A second side edge 2b has the same spacing from the first side edge 2a and therefore from the bending edge 4 as the side edges 3a and 3b of the second sheet-metal web 3 have from the bending edge 4.

A web aperture 5 starts from the second side edge 2b of the first sheet-metal web 2 and is divided into two parts by a guide sheet 2c which is disposed laterally next to a leaf spring 7 in the web aperture 5.

The leaf spring 7 assigned to the first sheet-metal web 2 having the web aperture 5 is elongate and is curved transversely to its own longitudinal direction away from the first sheet-metal web 2.

Both longitudinal edges at each spring end of the leaf spring 7 have a first tab 7a and an additional or second tab 7b which are located opposite one another. A notch 8a, 8b and a notch 9a, 9b, which is partially invisible are respectively provided in each case in the two edges of the tabs 7a and the additional tabs 7b. The edges are at right angles to the first sheet-metal web 2.

In the web aperture 5, the first sheet-metal web 2 forms two mutually opposite aperture edges 10a and 10b transversely to the second side edge 2b of the first sheet-metal web 2. These two aperture edges 10a and 10b are each disposed in another part of the web aperture 5 and oppose the elongation of the leaf spring 7. These aperture edges are mirror-symmetrically identical to one another, and each aperture edge 10a and 10b forms an inclined plane which starts from the second side edge 2b of the first sheet-metal web 2 and ascends towards a respective notch 11a and 11b in the respective aperture edge.

At one spring end of the leaf spring 7, the tab 7a and the additional tab 7b are pushed into one part of the web aperture 5 and, at the other spring end, the tab 7a and additional tab 7b are pushed into the other part of the web aperture 5, in each case starting from the second side edge 2b. While the guide sheet 2c engages into the mutually opposite notches 8b and 9b of the tabs 7a and the additional tabs 7b at the two spring ends of the leaf spring 7, so as to constitute guide notches, the aperture edges 10a and 10b engage into the other notches 8a and 9a on these tabs 7a and additional tabs 7b.

When the spring ends are pushed into the web aperture 5 as far as the lateral stop, the tabs 7a at the spring ends snap into the notches 11a and 11b of the respective aperture edges 10a and 10b. Since the leaf spring 7 is compressed along its longitudinal direction and is consequently pretensioned mechanically, due to the inclined planes formed by the aperture edges 10a and 10b, the leaf spring 7 presses its spring ends against the aperture edges 10a and 10b opposing the elongation of the leaf spring 7, so that the leaf spring 7 is firmly locked with its spring ends in the web aperture 5.

While the tabs 7a are snapped in the notches 11a and 11b of the aperture edges 10a and 10b of the web aperture 5 and bear against the aperture edges 10a and 10b there, the additional tabs 7b bear against points 12a and 12b of the inclined planes formed by the aperture edges 10a and 10b, so that the leaf spring 7 cannot tilt.

In the event of a spring break in the leaf spring 7, the two spring ends are retained positively and captively in the web aperture 5.

Figure 2:
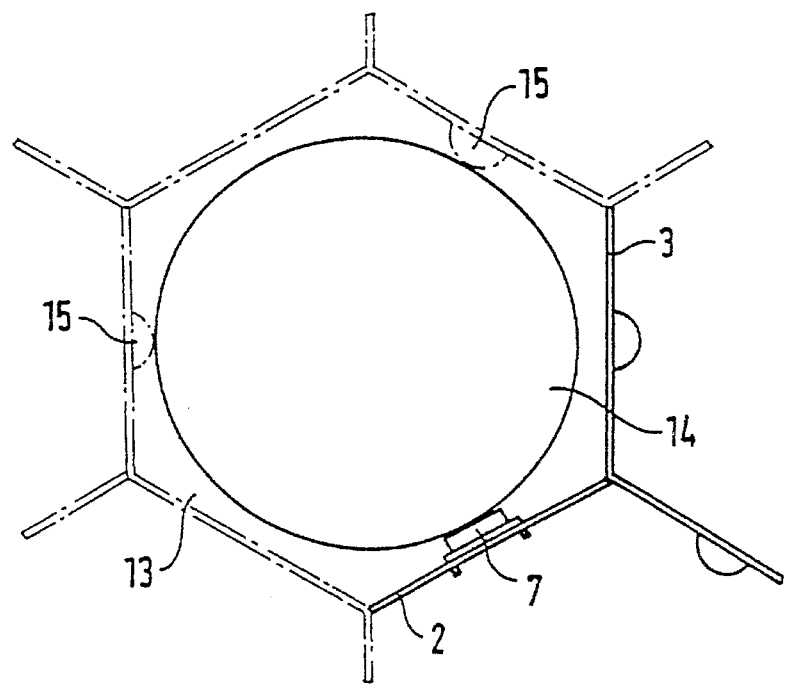
FIG. 2 is a top-plan view of a mesh of a grid-shaped spacer having the web according to FIG. 1.

As is shown in FIG. 2, in a grid-shaped spacer, units according to FIG. 1, which are formed from a first sheet-metal web 2 and from a second sheet-metal web 3, are assembled to form meshes or mesh openings 13 having a mesh contour constituting a regular hexagon and are respectively welded to one another at the side edges 2b, 3a and 3b. A mesh 13 can have a fuel rod 14 engaging through it. The leaf spring 7 of the sheet-metal web 2 bears flat against the fuel rod 14 and presses this fuel rod 14 against rigid knobs 15 on other sheet-metal webs.

Figure 3:
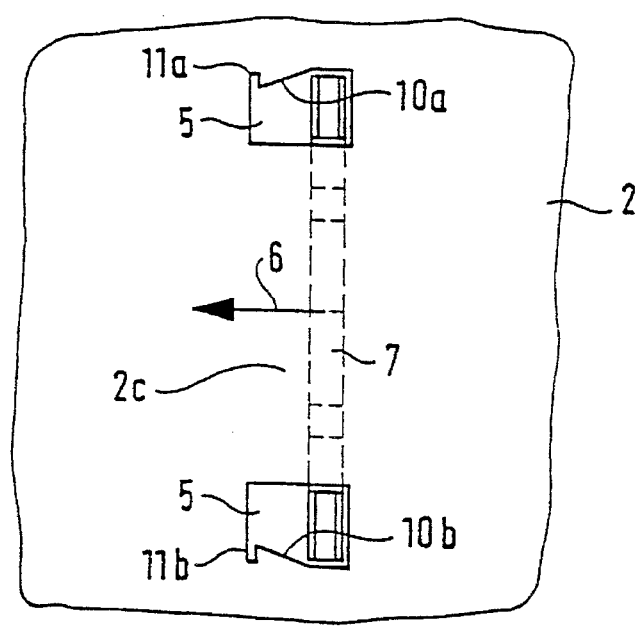
FIG. 3 is a fragmentary, side-elevational view of another embodiment of a sheet-metal web for a grid-shaped spacer with a leaf spring in an initial position.

A sheet-metal web 2 having a web aperture 5 can be seen in FIG. 3. The web aperture 5 is divided into two parts by the guide sheet 2c that is disposed laterally relative to the leaf spring 7. Both parts of the web aperture 5 have a point on one side, at which the tabs 7a and the additional tabs 7b can be inserted, without the aperture edges of the two parts of the web aperture 5 engaging into the notches 8a and 9a and without the guide sheet 2c engaging into the notches 8b and 9b constituting guide notches. As a result of the displacement of the leaf spring 7 into the snap-in position in the direction of the arrow 6, transversely to its longitudinal direction, onto the other side of the two parts of the web aperture 5, the leaf spring 7 is pretensioned mechanically by upsetting or compressing and finally, in the same way as the leaf spring 7 according to FIG. 1 snaps-in, it snaps in the notches 11a and 11b in the aperture edges 10a and 10b opposing the elongation of the leaf spring 7.

Figure 4:
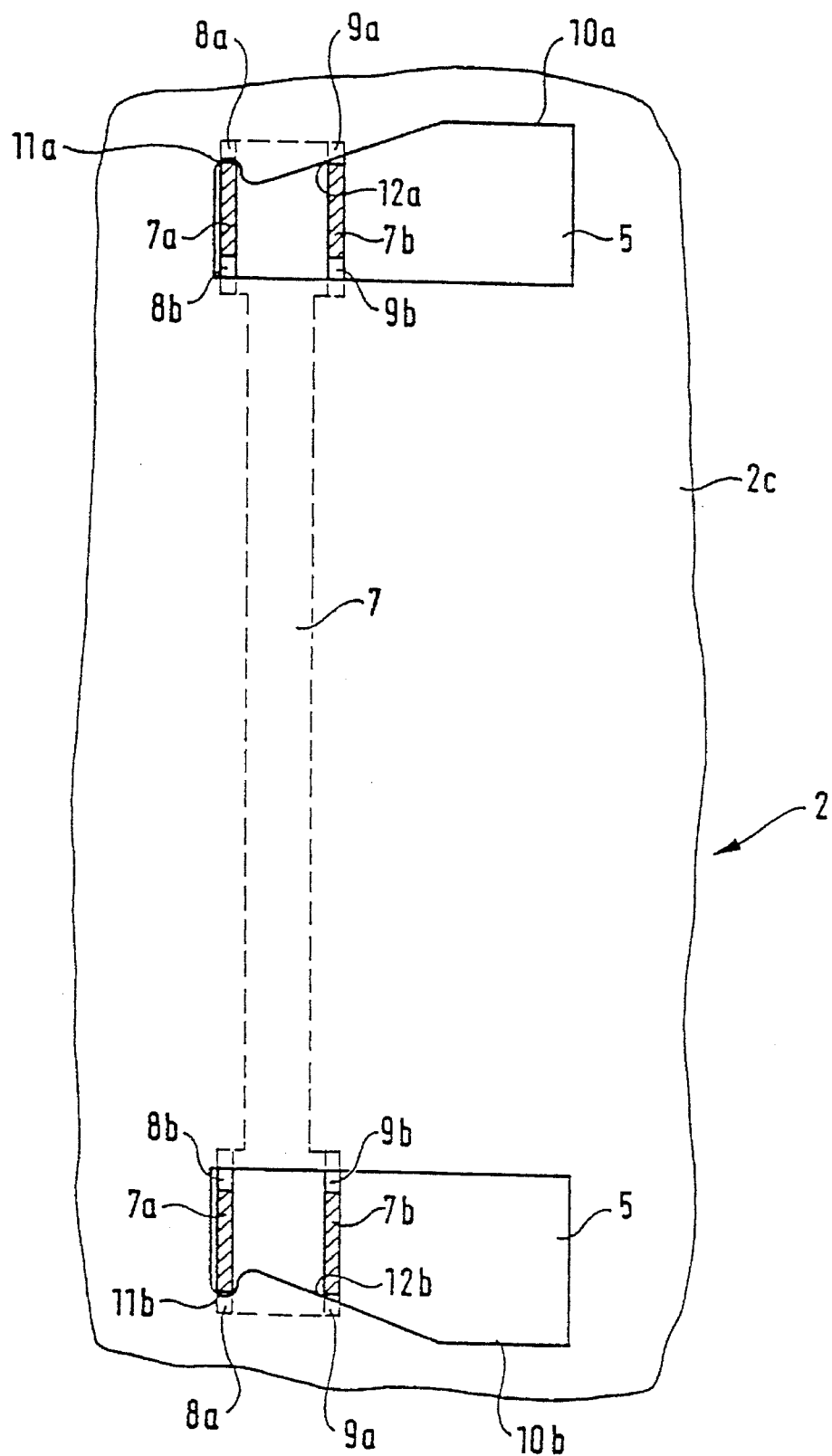
FIG. 4 is a fragmentary, enlarged view of the sheet-metal web according to FIG. 3 with the leaf spring in a snap-in position.

In FIG. 4, in which like parts bear the same reference symbols as in FIG. 3, it can be seen clearly that, in the snap-in position of the leaf spring 7, the additional tab 7b at one spring end of the leaf spring 7 bears against the point 12a of the inclined plane which forms the aperture edge 10a of the one part of the web aperture 5. The same applies accordingly to the other spring end, when the aperture edge 10b of the other part of the web aperture 5 for this other spring end is constructed mirror-symmetrically relative to the aperture edge 10a and the additional tab 7b bears against the point 12b of the inclined plane of the aperture edge 10b. This ensures that the leaf spring 7 cannot tilt in the web apertures 5 and 6.

Figure 5:
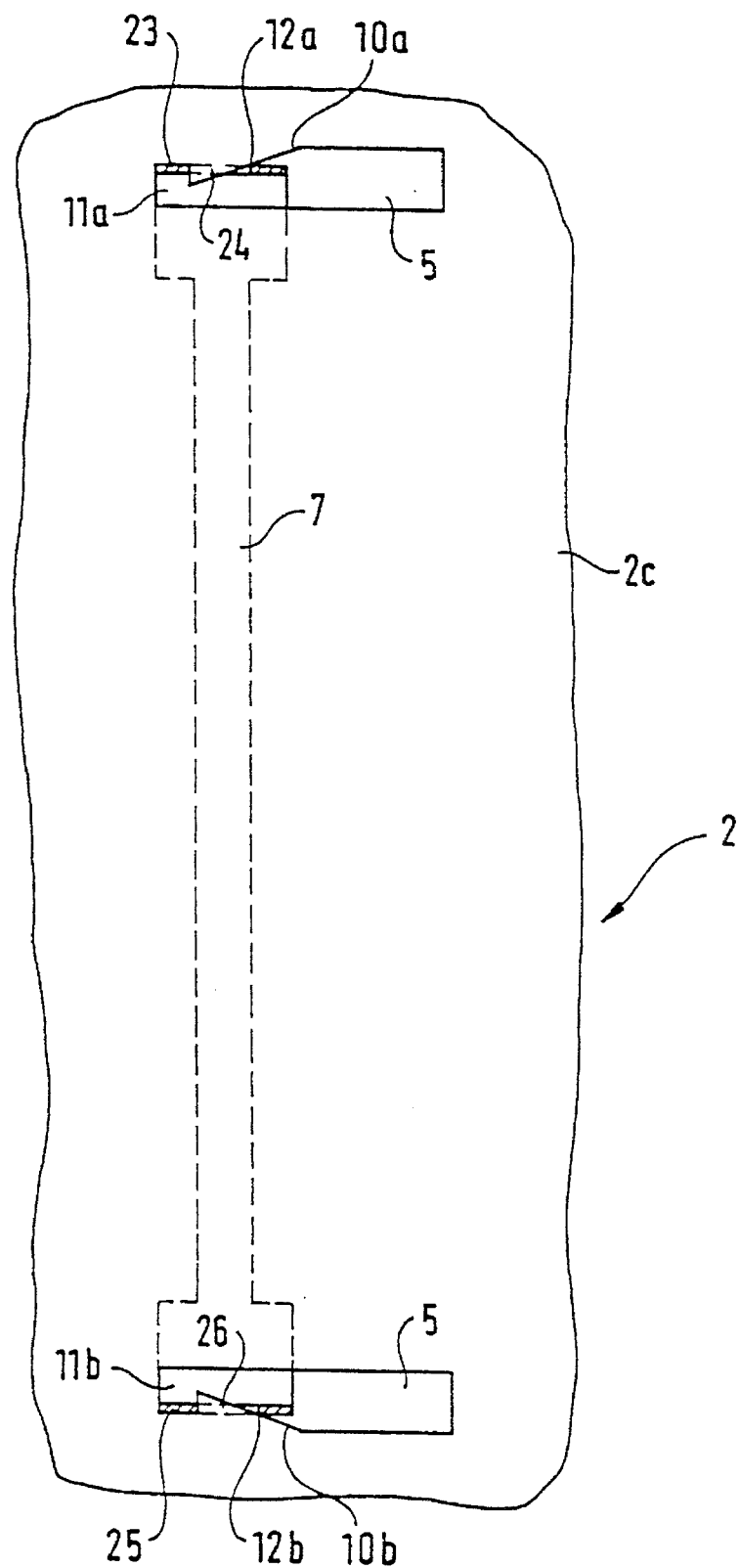
FIG. 5 is a view similar to FIG. 4 of a modification of the invention.

The modification according to FIG. 5, in which like parts bear the same reference symbols as in FIGS. 3 and 4, is that at each of the two spring ends of the leaf spring 7, a tab is constructed as a lug 23 or 25 which is formed on the respective spring end of the leaf spring 7 and which, in each case, engages through another part of the web aperture 5. These lugs 23 and 25 each have a lead-through 24 and 26 which engages through the aperture edge 10a and 10b, opposing an elongation of the leaf spring 7, on the inclined plane. Each tab which is constructed as a lug 23 or 25 bears both in the notch 11a and 11b and, on the inclined plane, at the points 12a and 12b on the aperture edges 10a and 10b, with the result that the possibility of a tilting of the leaf spring 7 is precluded.

We claim:

1. A grid-shaped spacer, comprising:

sheet-metal webs forming meshes for fuel rods of a nuclear-reactor fuel assembly, one of said webs having a web aperture formed therein defining two spaced-apart, mutually opposite aperture edges;

an elongate spring being disposed in a mesh, having a given longitudinal direction and being curved about a direction transverse to said given longitudinal direction, said spring including two spring ends each having a tab engaging through said web aperture with said mutually opposite aperture edges opposing an elongation of said spring; and at least one of said tabs at one of said two spring ends being snapped into a notch formed in one of said aperture edges opposing the elongation of said spring.

2. The grid-shaped spacer according to claim 1, wherein said one aperture edge opposing the elongation of said spring forms an inclined plane ascending towards said notch.

3. The grid-shaped spacer according to claim 1, wherein said spring is a leaf spring having two longitudinal edges, said tabs at each of said spring ends are both attached to one of said longitudinal edges of said leaf spring, said tabs have mutually confronting edges each having a guide notch formed therein, and including a guide sheet engaging in each of said guide notches and being disposed laterally relative to said spring at said web aperture.

4. The grid-shaped spacer according to claim 3, wherein said tabs are first tabs, and including second tabs each being associated with a respective one of said first tabs on the other of said longitudinal edges at a respective one of said spring ends of said spring, said second tabs engaging transversely through said web aperture and each having a guide notch formed therein into which said guide sheet engages, and said associated first and second tabs each have a further notch formed therein into which a respective one of said aperture edges opposing the elongation of said spring engages.

5. The grid-shaped spacer according to claim 4, wherein both said associated first and second tabs bear against one of said aperture edges opposing the elongation of said spring at each of said spring ends.

6. The grid-shaped spacer according to claim 2, wherein said aperture edge opposing the elongation of said spring engages through said tab.

* * * * *